Patented Jan. 6, 1931

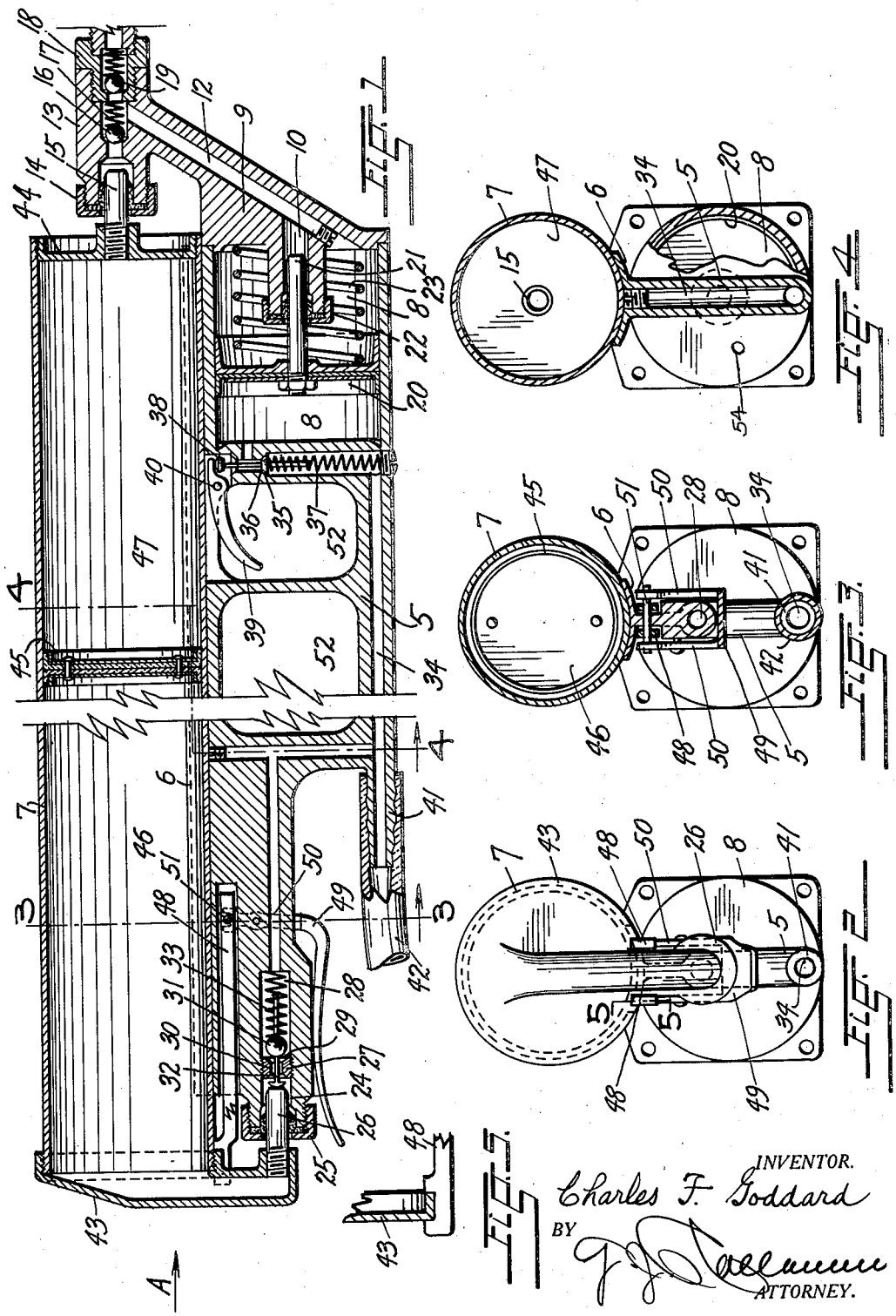

1,787,783

UNITED STATES PATENT OFFICE

CHARLES F. GODDARD, OF DENVER, COLORADO

GREASE GUN

Application filed March 26, 1928. Serial No. 264,940.

REISSUED

My invention relates to lubricating devices of the type commonly known as grease guns, and its primary object is to provide apparatus of this character in which a lubricant reservoir is demountably associated with a mechanism to forcibly feed lubricant from the reservoir to a machine part.

By the use of my invention, containers previously filled with a lubricant, may be held in reserve, so that when one container is exhausted, another may be immediately applied in the place thereof.

Another object of the invention is to provide in a grease gun, a very simple means for ejecting the lubricant from the reservoir by means of compressed air or other pressure fluid.

A further object is to provide a gun which ejects the lubricant in measured quantities according to the requirements of the machine part to be lubricated, and still other objects reside in details of construction and novel and useful arrangements and combinations of parts as will fully appear in the course of the following description.

In the accompanying drawings in which like characters of reference designate corresponding parts throughout the views, Figure 1 represents a sectional elevation of a grease gun constructed in accordance with my invention, a portion thereof having been broken away for lack of space, Figure 2, an end view of the gun, looking in the direction of the arrow A in Figure 1, Figure 3, a section taken on the line 3—3, Figure 1, Figure 4, a section along the line 4—4, Figure 1, and Figure 5, an enlarged fragmentary section on the line 5—5, Figure 2.

Referring further to the drawing, the gun comprises a stock 5 provided with a curved seat 6 for the support of the reservoir 7.

The stock carries the operative parts of the gun proper together with means for connecting said parts with the reservoir, and it is further associated with a source of fluid under pressure, and with hand-controlled devices for connecting the source with the grease-ejecting element of the gun.

The stock is, at its forward end, enlarged to provide a cylindrical piston-chamber 8 which is closed by means of a head 9 that has an air vent 54. The head has, in coaxial relation with the piston chamber, a plunger-chamber 10 of smaller diameter, which, by means of a duct 12, is connected with the interior of a coupling-member 13, adapted to connect the plunger-chamber with either the reservoir or a machine part to which the gun is applied.

The coupling has, at one end of its interior passage, a packing gland 14, adapted to admit a nipple 15 on the reservoir, as will hereinafter be described, and the flow of lubricant through said passage between the nipple and the duct, is controlled by a check-valve 16.

The valve is preferably of ball-form and is normally held in engagement with its seat 17 by a coiled spring that abuts against a hollow screw-gland 18 at the outer end of the coupling.

A second check-valve 19 may be employed to control the passage of lubricant from the duct 12 to a machine part to which the coupling is applied, but this second valve is not positively essential in the operation of the gun and may be omitted.

Fitted for reciprocation in the piston chamber, is a piston 20, with which is associated a plunger 21 fitted for reciprocation in the plunger-chamber.

A stuffing box 22 at the end of the small cylinder 10, prevents leakage of lubricant around the plunger into the larger cylinder 8.

A coiled spring 23 returns the connected pistons to their normal position after each ejective movement. It will be apparent that the pressure pump thus produced operates on the principle of a hydro-static press to the extent that it involves an element having differentiated areas, one of which is subject to fluid pressure for the exertion of a correspondingly multiplied pressure by the other.

At the other end of the stock 5 is a socket 24 which, at its outer end, is provided with a packing gland 25, to admit another nipple 26 on the reservoir 7.

The socket is partitioned by a threaded plug 27 which defines a valve-chamber 28, and which provides a valve-seat 29 in connection with a central passage 30.

A valve 31, of preferably spherical form, is mounted on a stem 32 which moves through the passage of the screw-plug.

The end of the stem, at the opposite end of the plug, has a head to be engaged by the end of the nipple 26, and a coiled spring 33 in the valve chamber, holds the valve to its seat when the nipple is withdrawn from the socket.

The valve-chamber 28 is connected with the larger cylinder of the pump by a duct 34, comprising a number of intercommunicating passages in the body of the stock. The passage of air or other pressure fluid through this duct from the valve-chamber of the socket 24 to the piston-chamber 8, is normally obstructed by a valve 35, which is held in place against a valve-seat 36 by a coiled spring 37.

The valve has a stem provided with an exhaust valve 38. The exhaust valve is engaged by a trigger 39 pivoted on the stock, as at 40.

Movement of the trigger 39 moves the valve 38 to its seat and moves the valve 35 from its seat, admitting fluid pressure in the duct 34 to the larger piston. When the trigger is released, the spring 37 seats the valve 35 and opens the valve 38, allowing the fluid pressure in the cylinder 8 to exhaust into the atmosphere.

The duct 34 has, at a point between the socket and the valve-seat, a nipple 41 for its connection with a source of pressure-fluid, the connection being usually established by medium of a flexible conduit 42.

The reservoir consists of a cylindrical container normally supported upon the seat 6 of the stock.

The container is closed at its ends by heads 43 and 44, and these heads carry the before mentioned nipples 26 and 15, which consist of short screw-threaded tubes tapered at their ends to facilitate their insertion through the packing glands 25 and 14, at the ends of the stock.

A free floating piston 45, in the container, divides the latter into an air-chamber 46 and a lubricant-chamber 47.

When the container is in its operative position with relation to the pump-element, its nipples extend through the packing-glands to connect the air-chamber 46 and the lubricant-chamber 47, respectively, with the socket 24 and with the coupling 13.

The container in this position is fastened in place by two latch bars 48, which embrace the head at the lower edge thereof, as shown in Figure 2, and which are held in contact with the head by a toggle lever 49, an arm 50 of which engages with studs 51, at the ends of the bars. The bars are slidably held in correspondingly formed slide ways at the rear end of the stock.

In the operation of the grease-gun, a reservoir whose lubricant-chamber 47 has previously been supplied with a lubricant, is fastened upon the seat 6 of the stock by means of the latch bars 48. In this position, the nipple on the head 43 of the reservoir, extends through the packing gland 25 into the socket 24 and the nipple 15, at the opposite end of the reservoir, extends through the packing-gland 14 into the hollow coupling-member 13 of the head 9 of the piston-cylinder 8 on the stock 5.

The nipple 26, by engagement with the stem 32, has separated the valve 31 from its seat, thereby establishing a constantly open connection between the source of pressure-fluid and the air chamber 46 of the barrel.

The valve 35 normally engages its seat to obstruct the passage of air from the source to the piston-chamber 8, through the duct 34, and the large piston 20, and the therewith connected smaller piston 21, are held at the ends of their respective chambers by the spring 23.

The valve 16, in the coupling, normally held to its seat by the spring 17, obstructs the connection between the duct 12 and the lubricant-chamber 47 of the container, it being understood that the duct 12, and the small piston-chamber 10, have been filled with a portion of the lubricant from the reservoir during a preceding operation of the gun. The piston-chamber measures the quantity of lubricant that can, at one time, be fed to a machine part to which the gun is applied.

The gun, in its operative condition, is attached to the source of air under pressure, by the conduit 42, and it is held in the hand of the operator who inserts his fingers through finger-opening 52 of the stock 5.

After the coupling-member 13 has been connected by any suitable means to the machine-part to be lubricated, the operator presses against the trigger 39, which projects in one of the finger-openings, and thereby opens the valve 35 and closes the valve 38 in the duct 34. This establishes the communication between the source of pressure-fluid and the piston-chamber 8, with the result that the large piston 20 is driven forwardly against the resistance of the spring 23.

The plunger 21 moving in conjunction with the larger piston, now drives a quantity of lubricant, measured by the content of the small piston-chamber, out from the duct 12 to the machine-part to which the coupling-member has been applied.

When the trigger 39 is released, the spring 37 closes the valve 35, shutting off the supply of fluid pressure in the duct 34, and opens the valve 38, allowing the fluid pressure in the cylinder 8 to exhaust into the atmosphere, and the spring 23 returns the pistons to their original position.

The void created in the small piston-chamber, and the duct 12, by the discharge of the lubricant to the machine-part, is now filled by the passage of a corresponding portion of the contents of the lubricant-chamber of the container past the valve 16 into the coupling-member, it being apparent that the lubricant in the container is constantly under pressure by the air admitted past the valve 31 and through the nipple 26, to the floating piston 45.

The gun is now again in condition for another operation and the operations may be repeated until the lubricant-chamber of the container is entirely exhausted. When this occurs the container is removed from the stock by loosening the latch bars 48, and withdrawing the nipples from their respective glands which obviously is easily accomplished by sliding the container rearwardly along its seat on the stock.

As soon as the container is demounted, the valve 31 is moved to its seat by the pressure of the spring 33, thereby preventing the escape of air.

Another container, previously filled with lubricant, is now mounted on the stock to replace the empty one, and the operator, by keeping a number of filled containers in reserve, may thus continuously feed a lubricant to the parts of an automobile, or other machine, as long as his supply of containers lasts.

Having thus described my improved grease-gun, I desire it understood that variations in the construction and arrangement of the essential elements and parts thereof may be resorted to without departing from the scope of the invention.

I claim:

1. A grease gun comprising a stock, a lubricant-ejecting element on the stock, a demountable container on the stock, a piston dividing the container into a lubricant-chamber and a pressure-chamber, a valve-controlled connection between the lubricant-chamber and the ejecting means, and valve-controlled means connecting the ejection-element with a source of pressure-fluid and connecting the source of pressure and the pressure-chamber, the said connections including nipples on the container, in sliding relation to the stock.

2. A grease gun comprising a stock, a lubricant-ejecting element on the stock, a demountable container on the stock, a piston dividing the container into a lubricant-chamber and a pressure-chamber, a valve-controlled connection between the lubricant-chamber and the ejecting means, valve-controlled means connecting the ejection-element with a source of pressure-fluid and valved connecting means between the source of pressure and the pressure-chamber the said connections including packing glands on the stock and nipples on the container, in sliding relation to the packing glands.

3. A grease gun comprising a stock, a demountable container on the stock, a piston dividing the container into a lubricant-chamber and a pressure-chamber, a lubricant-ejecting element on the stock, including piston-chambers of different diameters, connected pistons in the chambers, a coupling member on the stock in valve-controlled connection with the smaller piston-chamber, means on the stock for connecting the larger piston-chamber with a source of pressure-fluid, including a hand-controlled valve, a valve-controlled socket connected with the source of pressure and nipples on the container for connecting its chambers with the coupling and with the socket, respectively.

4. A grease gun comprising a stock, a demountable container on the stock, a piston dividing the container into a lubricant-chamber and a pressure-chamber, a lubricant-ejecting element on the stock, a coupling-member on the stock in valve-controlled connection with the ejecting-element, means on the stock for connecting the ejecting-element with a source of pressure-fluid, including a hand-controlled valve, a valve-controlled socket, connected with the source of pressure, and nipples on the container for the connection of its chambers with the coupling and with the socket, respectively.

5. A grease gun comprising a stock, a demountable container on the stock, a piston dividing the container into a lubricant-chamber and a pressure-chamber, a lubricant-ejecting element on the stock, a coupling-member on the stock in valve-controlled connection with the ejecting-element, means on the stock for connecting the ejecting-element with a source of pressure-fluid, including a hand-controlled valve, a valve-controlled socket connected with the source of pressure, and nipples on the container for the connection of its chambers with the coupling and with the socket, respectively, the nipple cooperating with the socket, controlling the position of the respective valve to open the same when the container is in place on the stock.

6. A grease gun comprising a stock, a demountable container on the stock, a piston dividing the container into a lubricant-chamber and a pressure-chamber, a lubricant-ejecting element on the stock, a coupling-member on the stock in valve-controlled connection with the ejecting-element, means on the stock for connecting the ejecting-element with a source of pressure-fluid, including a valve controlling the admission of pressure-fluid to the ejecting-element, a socket connected with the source of pressure, and a valve controlling the escape of fluid from the socket, a trigger on the stock in operative relation to the first mentioned valve, and nipples on the container for the connection of its chambers with the coupling and with the socket, respectively, the nipple cooperating with the socket, controlling the position of the respective valve to open the same when the container is in place on the stock.

7. A grease gun comprising a stock, a demountable container on the stock, a piston dividing the container into a lubricant-chamber and a pressure-chamber, a lubricant-ejecting element on the stock in valve-controlled connection with the lubricant-chamber, means on the stock for its connection with a source of pressure-fluid, including a passage to the ejecting-element, and a socket, a hand-moved valve controlling the passage, a spring-pressed valve normally closing the socket against the escape of pressure-fluid, and a nipple on the container connecting its pressure-chamber with the socket, and engaging the valve to hold it off its seat.

8. A grease gun comprising a stock, a removable grease container slidably mounted on the stock, a piston in the container for driving grease therefrom, nipples on the container at opposite sides of the piston, means on the stock for feeding pressure fluid to one of the nipples, to drive the piston, and mechanism connected with the other nipple for receiving and expelling grease driven from the container.

9. A grease gun comprising a stock, a removable grease container slidably mounted on the stock, a piston in the container for driving grease therefrom, nipples on the container pointing in the same direction and being at opposite sides of the piston, fittings on the stock into which the nipples are slid, when the container is slid into position on the stock, and means on the stock for feeding air-pressure to one fitting and to receive and expel grease driven from the other fitting.

10. A grease gun comprising a stock, a removable grease container thereon, the stock having a connection with the container to feed air-pressure thereto, means to automatically close said connection, said means being rendered operative by removal of the container, and mechanism for expelling grease diven from the container by the air pressure.

11. A grease gun comprising a stock, having a pressure line, a lubricant-ejecting element on the stock, a demountable container on the stock the stock being outside of the container, movable means dividing the container into a lubricant chamber and a pressure chamber, a sliding connection between the lubricant chamber and the ejecting means, and a sliding connection between the pressure line and the pressure chamber.

12. A grease gun comprising a grease container having an air inlet and a grease outlet, a stock outside the container, and sliding connections between the stock and said inlet and outlet.

13. A grease gun comprising a stock, a grease container on the stock, the stock being outside the container, the container having an air inlet and a grease outlet, an air pressure line on the stock, and a sliding connection between the air inlet of the container and said air line.

14. A grease gun comprising a demountable container having a pressure inlet and a grease outlet and a stock outside of and separable from the container, the stock having sliding connections with said inlet and outlet.

In testimony whereof I have affixed my signature.

CHARLES F. GODDARD.